Jan. 23, 1968

LE ROY H. EASTON 3,364,772

GEARMOTOR UNIT

Filed May 19, 1965

INVENTOR.
LEROY H. EASTON

BY Ely, Gohrick & Flynn

ATTORNEYS

United States Patent Office 3,364,772
Patented Jan. 23, 1968

3,364,772
GEARMOTOR UNIT
Le Roy H. Easton, Cuyahoga Falls, Ohio, assignor to Ametek, Inc., a corporation of Delaware
Filed May 19, 1965, Ser. No. 457,046
3 Claims. (Cl. 74—421)

ABSTRACT OF THE DISCLOSURE

A gearmotor unit comprising an integral hollow gear housing with opposed walls and a joining wall portion having an opening to the space between the walls and, machined in the opposed walls, opposed bearing bores for an input-gear-carrying motor shaft and an output-gear-carrying output shaft, and aligned larger and smaller bearing apertures for an intermediate-gear-pair-carrying shaft, as well as motor casing centering and mounting formations on one opposed wall as a motor end bracket, and also mounting formations on the other opposed wall; a needle bearing pressed into the smaller aperture, and an output bearing in its said bore; an intermediate gear and shaft assembly, and an output gear; said housing as so machined and said assembly and output gear adapted for inserting the output gear through the opening into said space and the output shaft through its bearing into the output gear and to inserting the intermediate gear and shaft assembly by canting to slip its first end with a smaller gear spaced therefrom into the larger aperture permitting its other end to be swung into alignment with and axially slipped into the needle bearing and the smaller gear into mesh with the output gear, and then from the exterior inserting and securing in the larger aperture a bearing thereby slipped on the said first end; and assembled with the housing as a motor end bracket, a motor sub-assembly having a projecting shaft carrying a bearing and input gear brought respectively into the input bearing bore and into mesh with the larger intermediate gear.

---

The present invention relates generally to gearmotor units, and more particularly to a structure in gearmotor units conducive to ease of fabrication, therefore to lower cost, and as well to a method of manufacturing the unit.

In gearmotor units, that is combinations of an electric motor and a gearing train, usually intended for speed reduction, a multitude of constructions has been used, among which the specific designs have been of course determined in part by the type of motor, the power or speeds to be handled, the type or size of gearing, or the relative disposition of the axes of the motor shaft and output shaft of the unit. So also structure or design has been affected or determined by the ultimate application or intended environment of use. Obviously different requirements would arise where the gearmotor unit actually is to be a major part of power tools such as a drill or saw, or is intended for fixed mounting adjacent to and powering say a conveyor system, agitator, or a door, among few of many varied applications.

Quite frequently the motor and the gearing sections of such a unit have a common casing element providing at least one wall of the gear housing and also serving as a motor end bracket supporting an end of the motor shaft projecting therethrough into a gearing space. Such common element may provide in the gear casing no more than one end wall. The rest of the casing may be constituted of a hollow open-ended, cast or otherwise-fabricated, element secured to the common element providing a second end wall spaced therefrom as well as the rest of the enclosure; or it may be provided by several elements bolted together. Also in some cases the common element has included integral spacing and circumferential enclosure means on which a second end wall is secured. In these arrangements suitable apertures are provided in the two end walls and elsewhere in which the motor shaft as the input shaft to the gearing section, and intermediate stub or idler shafts are supported with the appropriate bearings as required.

Such prior constructions have involved certain disadvantages entailing higher costs in obtaining a quality product, arising from a multiplicity of housing parts, difficulties in machining separate casing parts, for example, with requisite accuracy of shaft journal or bearing socket locations relative to each other and to securing means for the parts, and at times certain awkwardness in assembling.

It is the general object of the present invention to eliminate one or more of such disadvantages of prior constructions. For this purpose, as hereinafter disclosed in a gearmotor unit constituting a major part of a hand portable tool such as an electric drill, power wrench or the like wherein the motor shaft and the output shaft of the unit are to be in substantial alignment, the invention provides substantially the entire gearing housing or casing as an integral unit providing fixed end walls in which one or more of the various shafts are supported, and providing the end bracket for the motor portion of the unit. At one side parallel to the shaft axes, an opening closed by a small plate provides access to the interior of the casing for assembly and servicing purposes; but the closure plate serves in no ways as a spacing or supporting element for other basic parts of the casing or for the mechanism. Two opposed generally parallel end wall structures are provided in one casting constituting the gear casing, in which may be readily machined all bearing receiving sockets or apertures, and any locating surfaces used with respect to other portions of the gearing or motor housings, in such manner that coaxially aligned openings for opposed shaft ends or for bearings of aligned shafts are readily bored or reamed or otherwise machined with a minimum of work piece set ups. This in itself, of course, advantageously conduces to lower cost and assures the ready alignment of bearing or shaft receiving portions.

Further with the construction used and the mode of assembly thereby enabled, there is eliminated any need of special care to align separate opposed portions of the casing intended to support opposite ends of shafts or to support distinct shafts in alignment.

Other objects and advantages of the invention will appear from the following description and the drawing wherein.

Figure 2:
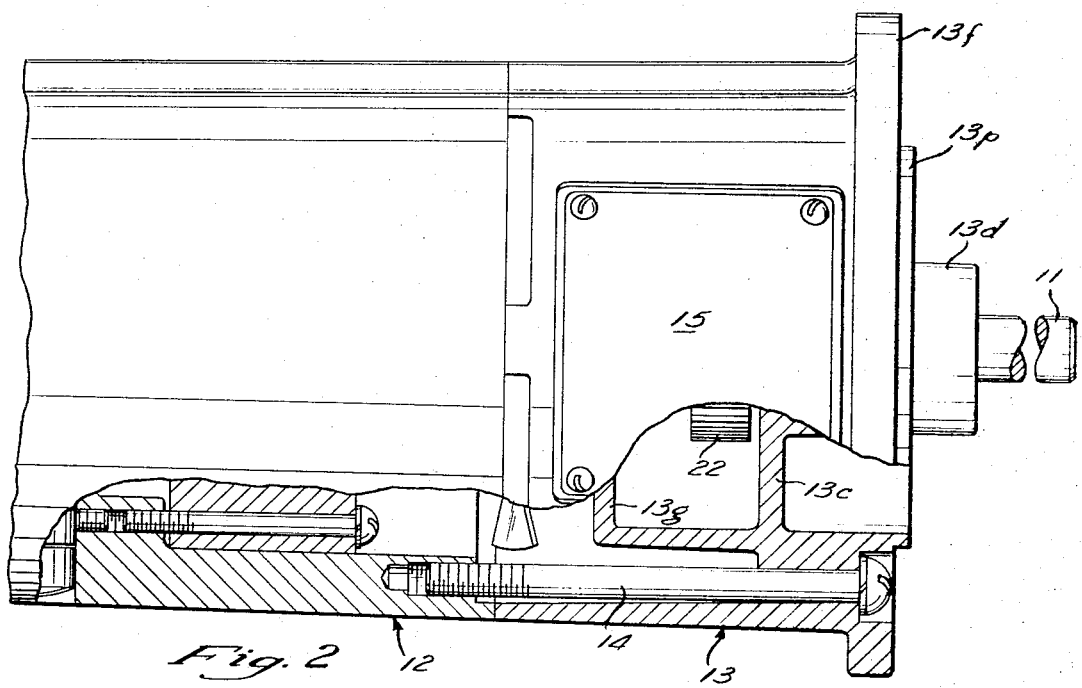
FIG. 2 is a fragmentary elevational view also showing a partially axial section taken at right angles to that of FIG. 1.

In the drawings the invention is shown as embodied in a gearmotor unit such as would be adapted for use in a portable electric hand tool; the unit being comprised of a motor section M and a reduction gearing section G for driving the unit output shaft 11 at reduced speed. Two primary frame or housing elements are involved, readily produced by casting or other suitable means, namely a main motor casting 12 and a gearing housing casting 13 which are secured together by longitudinally extending bolts 14 (see FIG. 2) in the manner hereinafter described.

The motor housing member 12 comprises, as an integral structure, a generally cylindrical body portion 12b closed at its left end by an integral end wall formation including a central motor shaft bearing receiving socket, and having in at least a part of its open right end an internal rabbet 12c adapted to receive the externally rabbeted left end portion 13a of cylindrical body portion 13b of the gear housing member 13.

Figure 1:
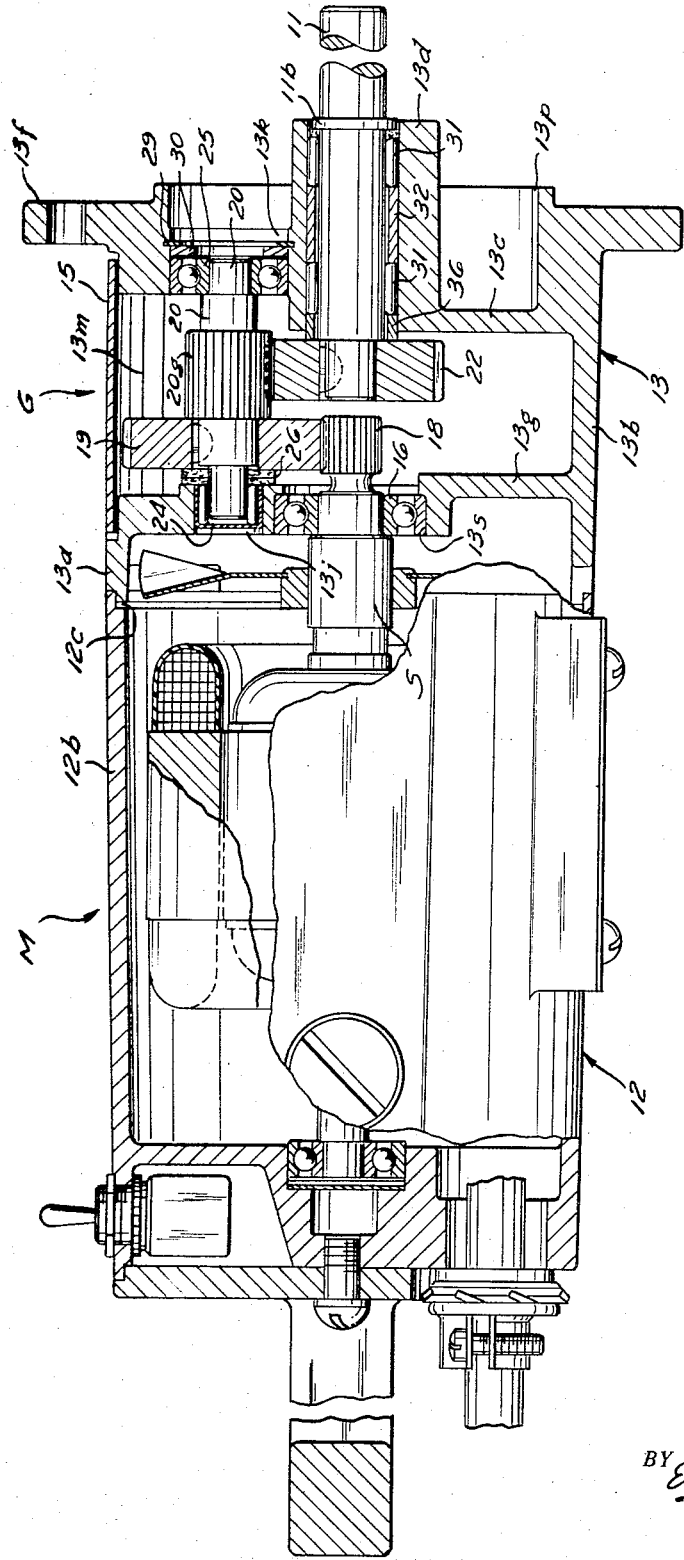
FIG. 1 shows a gearmotor unit embodying the present invention in partial horizontal longitudinal axial section.

In the member 13, as an integral structure, the generally cylindrical body portion 13b has at its right end an exterior circumferential mounting flange 13f apertured for bolts securing the unit in the environment of use; an internal web formation 13c including a central endwise projecting tubular portion 13d, and at its left side a second web portion 13g forming with 13c in effect opposite end walls of the gearing housing for mounting the elements hereinafter described. At the top of FIG. 1, the body portion 13b is shown as having an aperture 13m covered by a curved plate element 15. At a thickened central portion, the web or wall 13g is centrally apertured and in effect counterbored from the left to provide a socket 13s for receiving a bearing 16 for the right end of the motor shaft S projecting therethrough. The extreme right end of shaft S within the gearing casing is formed with an integral pinion 18 meshing with the gear 19 shown keyed to a shaft 20 having an integrally formed gear 20g in turn meshing with the gear 22 keyed to and pressed onto the reduced left end of the output shaft 11 as hereinafter described.

The shaft 20 with integral gear formation 20g and keyed gear 19 as an assembly are rotatably supported in the housing end walls by the needle bearing 24 pressed into an opening 13j in the web 13g and by a ball bearing 25 received in the socket formation 13k of the right end web; the assembly being axially positioned by the spacer washers 26 on the reduced left end between the web 13g and the face of bearing 19, and at the right by a snap ring 29 received in an internal groove in the seat 13k with interposed spacer 30 between 29 and the outer race of the bearing 25.

The shaft 11 is rotatably supported by inner and outer needle bearings 31 received in the tubular bore of 13d with an interposed spacer sleeve 32, this assembly being axially positioned by engagement of a shoulder 11b on the shaft bearing against a fibre shock absorber washer 34 and a thrust "Oilite" ring pressed into the left end of 13d but projecting therefrom to engage the right face of the gear 22. The shoulder 11b may be either an integral part of the shaft or provided by a split ring engaged in a suitable circumferential shaft groove.

In manufacture, after the housing member 13 is produced by any suitable casting techniques, including any cleanup or ordinary grinding attendant thereon, the part may be chucked for example at the flange 13f for boring or reaming to desired sizes the socket 13s for the bearing 16, the bore in 13d for the several bearing spacer elements received therein, and for turning if desired the left face of the flange 13f, with the part thereafter resetup for turning the right face of the flange 13f and also the circumference of the centering or piloting lip 13p thereof, utilizing if desired surfaces turned or machined on the first set-up for chucking or locating. Thereafter on one set-up on a drilling machine and in one position the bearing sockets 13j and 13k can be bored and the snap ring retaining groove cut in the latter, whereupon the bolt apertures may be bored in the flange 13f.

Figure 3:
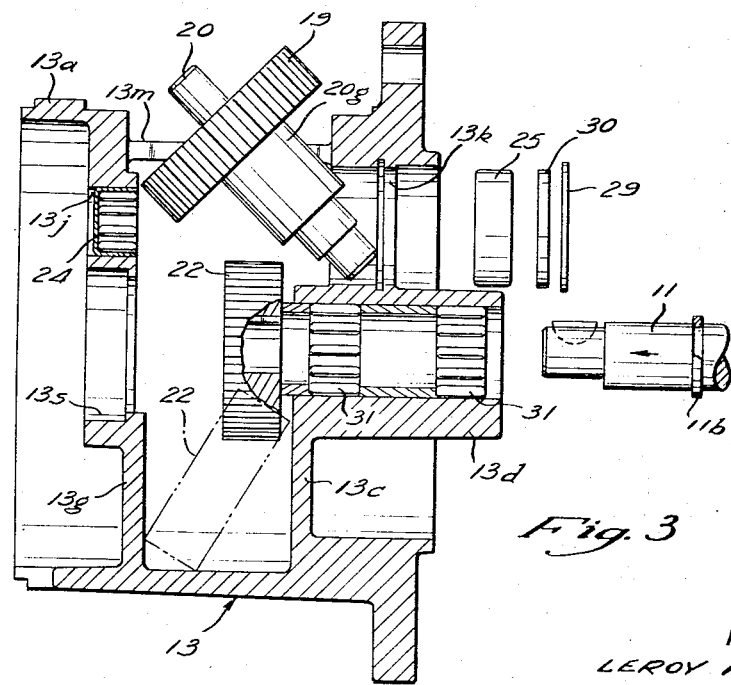
FIG. 3 is a fragmentary view illustrating a way of assembling the gearing section.

After all machining operations have been completed on 13, in a first assembly stage the needle bearing 24 is pressed into place, and so also the "Oilite" ring 36, inner bearing 31, spacer 32 and outer bearing 31. Thereafter the gear 22 is placed in the housing, either loosely until after insertion of a sub-assembly comprised of the gear 19 pressed and keyed onto a shaft 20 as hereinafter explained, or positioned for receiving of the output shaft 11 inserted from the right end as indicated in FIG. 3 carrying the fibre washer loosely with its reduced end press fitted into the gear 22. Thus conveniently the assembly of 22 on shaft 11 may be done after the insertion of the sub-assembly providing gears 19 and 20g on shaft 20.

By the use of the needle bearing 21 for the left end of the shaft 20, and the large opening provided for the ball bearing unit at the right end, the described gear sub-assembly, with spacer thrust washers 26 being already in place thereon, may be inserted right end first with turning as indicated by the dotted lines as shown in FIG. 3 until the shaft is in alignment with the aperture in the needle bearing 24; and thereupon the sub-assembly is moved to the left, and the ball bearing unit 25 inserted into base 13k and onto the right end of shaft 20. Next the intervening shim or spacer 30 is placed in position, and the snap ring is put in place in its receiving groove, completing the assembly of the gearing components in housing 13 except of course for motor shaft bearing and pinion 18. The bearing 16 being previously placed either in socket 13s or on shaft S, thereafter the housing 13 and motor housing 12 with motor elements already assembled therein are brought into aligned end-to-end position, which brings the shaft pinion into proper position, extending through the motor end bracket provided by web 13g as a gear housing end wall and meshed with gear 19, whereupon the securing bolt means 14 are spaced and tightened up to complete the main assembly operations for the gearmotor unit. Thereafter, of course, suitable lubricant is packed into the gearing housing, as needed, before the closure plate 15 is secured by screws or other suitable means.

A minor variation of the assembly was indicated above where the possibility was adverted to of inserting the gear 22 loosely resting in the housing as indicated by the dashed lines in FIG. 3, while the sub-assembly of gears 19–20g is first inserted and secured. The gear 22 thereafter can still be manipulated into position by access through spring 15 and the space around the gears 10–20g for the operations involved in placing shaft 11; support of 22 also being possible by a bar or tool element inserted through the central shaft aperture of socket 13s. This procedure may be of advantage, for example, in a situation where the output shaft has a helical gear connection with a corresponding form in gear 20g in order to have the output shaft in skewed disposition to the other shaft axes for extending through the wall 13b.

Since spur gearing is contemplated in the arrangement of the drawings, there are no bearing arrangements shown adapted to take thrust, as might be used—where, for example, a helical first stage is present—by providing inner shoulders on shaft 20 and in bore 13k respectively and grooving shaft 20 for a further retainer ring for the inner race, thereby axially securing bearing 25 to enable shaft 20 to take a thrust component in either direction. With element 13 increased in thickness to afford a shoulder at the inner end of bearing bore 13k, then a lead-in slot might conveniently be provided to accommodate the end of the gear shaft sub-assembly as it is inserted.

I claim:

1. In an assembly of electric motor elements and gearing elements providing a rotary driving unit providing a speed change from a motor shaft to an assembly output shaft, the combination of: an integral hollow housing member for gearing including a first wall portion, said wall portion having on an outer face an outwardly open motor shaft bearing receiving socket, centrally apertured for a motor shaft end projecting therethrough, and locating formations adapted to engage an end of a motor field supporting motor frame member whereby said housing member serves also as a one motor end bracket supporting a motor shaft bearing with the shaft extending into the housing interior, a second wall portion extending generally parallel to the first, and a third generally circumferentially extending wall portion joining the first to the second wall portion as integral opposed wall portions; and an elongated cylindrical formation integral with one of said second and third wall portions providing an output shaft bearing receiving bore for supporting an output shaft extending therethrough; a motor shaft supported by a bearing in said socket and carrying an input gear within said housing; output shaft bearing means in said bore adapted to be pressed therein from the exterior of said housing member to a fixed axial location and to receive the output shaft slid in from the exterior; an exteriorly projecting output shaft rotatably supported by said bearing means, carrying an output gear with a press fit and keyed on an end of the shaft within the housing interior, said output shaft carrying means providing a shoulder spaced from and cooperating with said output gear in engaging opposite ends of said bearing means in an output shaft and output gear locating manner, a sub-assembly comprised of an intermediate shaft and two gears of diverse diameters secured thereon for simultaneous rotation therewith, and having opposite shaft ends rotatably supported in said first and second wall portions, one of the intermediate shaft ends proximate to the larger of said two gears supported by a needle bearing with a press fit in an aperture in one of said opposed wall portions and the other of its ends shouldered and supported by an antifriction bearing having an inner race with a slip fit on said other end and an outer race with a slip fit in a bore through the other of said opposed wall portions aligned with said aperture; the portion of the intermediate shaft between said shouldered end and the smaller of the gears thereon being of smaller diameter than the last said bore; means on the intermediate shaft limiting shaft entrance into said needle bearing; bearing retaining means in the last said bore outboard of the bearing therein; said third wall portion having therethrough an opening adjacent the location of and adapted to receive therethrough said subassembly; and closure means for the last said opening removably secured to said third wall portion; whereby all bearing and shaft receiving apertures for said gearing elements and for said one end bracket are provided in an integral member, and said combination may be assembled by inserting first said needle bearing and bearing means and thereafter said output gear with said sub-assembly inserted through said opening by directing the shaft end with small gear into said bore for the antifriction bearing and thereafter shifting to insert the other end in the needle bearing and subsequently inserting the antifriction bearing and bearing retaining means.

2. The combination as described in claim 1, wherein said elongated cylindrical formation is integral with said second wall portion.

3. In an assembly of electric motor elements and gearing elements providing a rotary driving unit affording a speed change from a motor shaft to an assembly output shaft, the combination of: an integral hollow housing member for gearing including a first wall portion, said wall portion having on an outer face an outwardly open motor shaft bearing receiving socket centrally apertured for a motor shaft end projecting therethrough, and locating formations adapted to engage an end of a motor field supporting motor frame member whereby said housing member serves also as one motor end bracket supporting a motor shaft bearing with the shaft extending into the housing interior, a second wall portion extending generally parallel to the first, and a third wall portion joining the first to the second portions and defining therewith a gearing enclosing space; and an elongated cylindrical formation integral with said second wall portion and aligned with said motor shaft bearing receiving socket and providing an output shaft bearing receiving bore for supporting an output shaft extending therethrough; a motor shaft supported by a bearing in said socket and carrying an input gear within said housing; output shaft bearing means in said bore adapted to be pressed therein from the exterior of said housing member to a fixed axial location and to receive the output shaft slid in from the exterior; an exteriorly projecting output shaft rotatably supported by said bearing means carrying an output gear with a press fit on and rotationally fixed on an end thereof within the housing interior, said output shaft carrying means providing a shoulder spaced from and cooperating with said output gear in engaging opposite ends of said bearing means in an output shaft locating and output gear locating manner; a sub-assembly comprised of an intermediate shaft and two gears of diverse diameters secured thereon for simultaneous rotation therewith and having opposite shaft ends rotatably supported in said first and second wall portions, one of the intermediate shaft ends proximate to the larger of said two gears supported by a needle bearing with a press fit in an aperture in the first said wall portion and the other of its ends shouldered and supported by an antifriction bearing having an inner race with a slip fit thereon and an outer race with a slip fit in a bore through the second said wall portion aligned with said aperture; the portion of the intermediate shaft between said shouldered end and the smaller of the gears thereon being of smaller diameter than the last said bore; means on the intermediate shaft limiting shaft entrance into said needle bearing; bearing retaining means in the last said bore outboard of the bearing therein; said third wall portion having therethrough an opening adjacent the location of and adapted to receive therethrough said subassembly; and closure means for the last said opening removably secured to said third wall portion; whereby all bearing and shaft receiving apertures for said gearing elements and for said one end bracket are provided in an integral member, and said combination may be assembled by inserting the first said needle bearing and bearing means and thereafter said output gear with said sub-assembly inserted through said opening by directing the shaft end with said small gear thereon into the last said bore for the antifriction bearing and thereafter axially shifting said sub-assembly to insert the other end in the needle bearing and subsequently inserting the antifriction bearing and bearing retaining means.

References Cited
UNITED STATES PATENTS 2,578,446  12/1951  O'Daniel _____ 74—421

FOREIGN PATENTS 540,974  4/1928  Germany.
576,436  8/1928  Germany.
588,185  11/1932  Germany.

ROBERT A. O'LEARY, *Primary Examiner.*

DAVID J. WILLIAMOWSKY, DONLEY J. STOCKING, *Examiners.*

L. H. GERIN, *Assistant Examiner.*